United States Patent [19]

Kaeser

[11] 4,118,826

[45] Oct. 10, 1978

[54] MOBILE BLOWER UNIT FOR LEAVES AND OTHER DEBRIS

[75] Inventor: Arthur L. Kaeser, Springfield, Ohio

[73] Assignee: Parker Sweeper Company, Springfield, Ohio

[21] Appl. No.: 682,385

[22] Filed: May 3, 1976

[51] Int. Cl.² ............................................. A47L 5/14
[52] U.S. Cl. ...................................... 15/328; 15/361; 15/405
[58] Field of Search ................. 15/328, 405, 330, 361; 417/231, 234; 415/148

[56] References Cited

U.S. PATENT DOCUMENTS

| | | | |
|---|---|---|---|
| 1,961,225 | 6/1934 | Juelson | 55/442 X |
| 3,241,173 | 3/1966 | Finn | 15/328 |
| 3,539,271 | 10/1970 | Greenwood | 415/148 |
| 3,618,157 | 11/1971 | Bassin | 15/330 |
| 3,959,846 | 6/1976 | Yasuda | 15/405 X |
| 3,968,938 | 7/1976 | Ruhl et al. | 15/405 X |

OTHER PUBLICATIONS

*Popular Science*, vol. #202, #4, Apr. 1973, p. 87, by E. F. Lindsley, "Big Wind for the Backyard".

*Primary Examiner*—Christopher K. Moore
*Attorney, Agent, or Firm*—Jacox & Meckstroth

[57] ABSTRACT

An internal combustion engine is mounted on a frame supported by a set of wheels and has a shaft connected to drive a blower impeller. An annular plate is mounted on the engine surrounding the engine shaft, and a blower housing has a support ring which is secured to the plate by a releasable band clamp to provide for rotating the blower housing on the axis of the engine shaft. The blower housing has a center inlet and a laterally projecting tangential outlet, and a movable air deflector is mounted on the housing adjacent the outlet. The air deflector is actuated by an elongated control rod which extends from a handle assembly projecting rearwardly and upwardly from the frame, and the control rod permits the operator to actuate the air deflector when the blower outlet and deflector are located at either a high position on one side of the frame or a low position on the opposite side of the frame.

8 Claims, 7 Drawing Figures

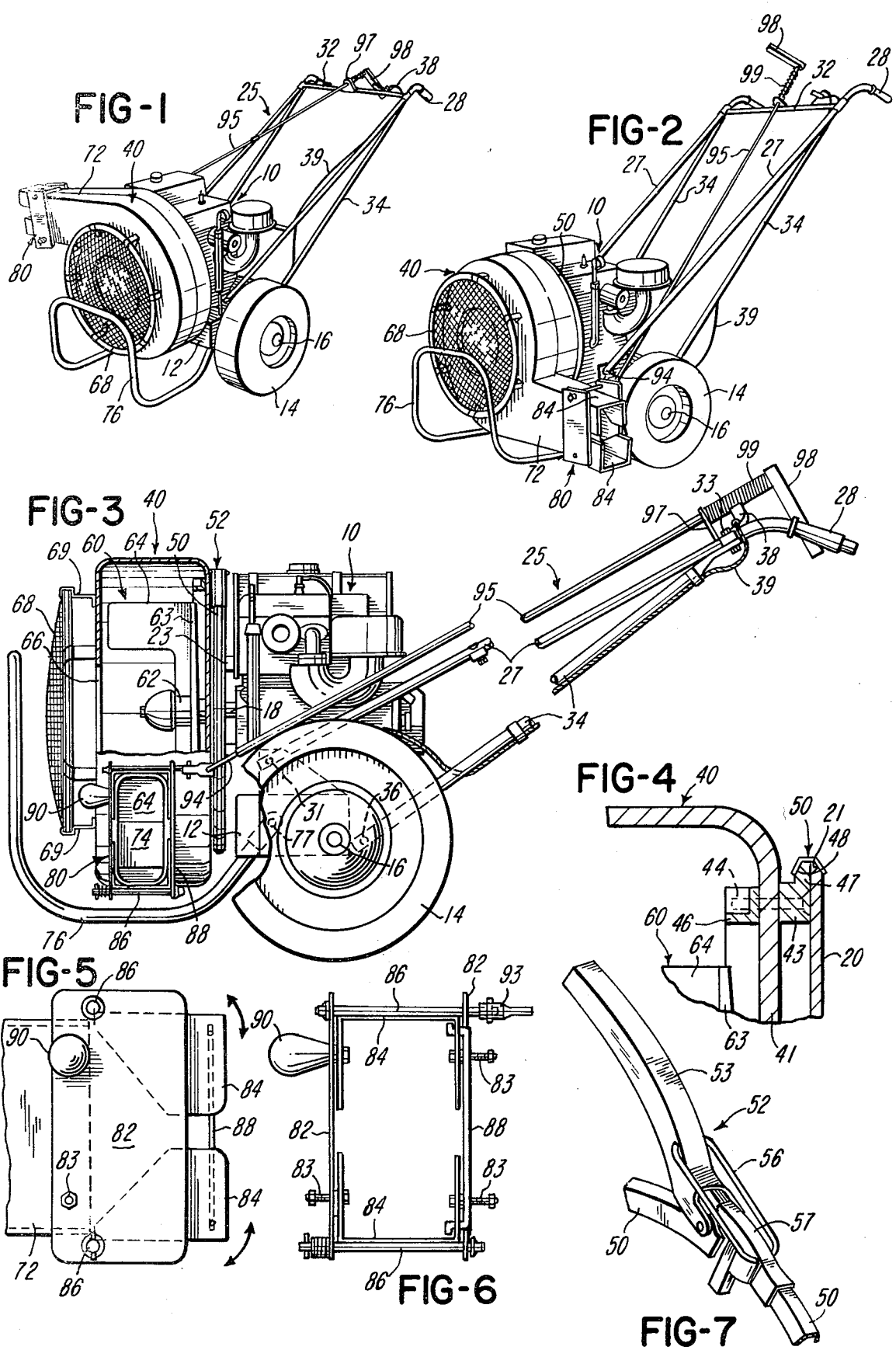

MOBILE BLOWER UNIT FOR LEAVES AND OTHER DEBRIS

BACKGROUND OF THE INVENTION

In the construction of mobile units for removing leaves and other debris from a lawn, driveway or other surface, it is sometimes desirable to collect the leaves and debris by means of a portable vacuum cleaner of the general type disclosed in U.S. Pat. No. 3,534,429 which issued to the assignee of the present invention. In such a vacuum cleaner, a gasoline driven engine is mounted on a frame which is supported by a set of wheels, and the engine shaft drives an impeller located within a centrifugal-type blower housing which is mounted on the engine. As disclosed in the above patent, the blower housing has a center inlet which is connected to a suction inlet nozzle and has a tangential outlet which directs the collected debris into a bag-like container located rearwardly of the engine between a handle assembly projecting upwardly and rearwardly from the frame.

It is also common to remove leaves and other debris from a surface by means of a mobile blower unit which does not incorporate a suction inlet nozzle and a collection bag or container, but simply directs a blast of air from the blower outlet towards or across the surface. In such a mobile blower unit, frequently the blower housing is mounted so that its outlet is in a low position adjacent the ground surface to produce a tangential air blast from the bottom of the blower housing generally parallel with the ground or other surface. It is also common to mount the blower housing on the engine with the blower outlet in a high position so that the air blast is directed downwardly from the top of the blower housing at an incline towards the ground or surface.

When the outlet of the blower housing is located in a high position, it has been found desirable to mount an adjustable air deflector on the outlet portion of the blower housing and to provide the operator of the blower unit with means for adjusting the position of the deflector to vary the angle at which the air blast is directed against the ground or other surface. For example, when fallen leaves have become wet and soggy, the leaves become matted and are difficult to move unless the air blast is directed downwardly at an acute angle under the leading edge of the matter leaves. By adjusting the position of the deflector assembly, the operator can precisely select the angle at which the air blast is discharged according to the volume of collected leaves or debris, the degree of wetness and the type of surface.

On the other hand, when the leaves are dry and the ground surface is covered by long grass, it is sometimes desirable to have the blower outlet in a low position with the air blast directed generally parallel to the ground surface. However, after a mass of dry leaves have been collected in a windrow, the air blast from a low position outlet tends to blow holes or tunnels within the windrow of leaves. It is then desirable to have a blower with its outlet in a high position and with the air blast directed downwardly so that the windrowed leaves can be more effectively rolled or moved.

SUMMARY OF THE INVENTION

The present invention is directed to an improved mobile blower unit for removing fallen leaves and other debris from a surface and which incorporates a simplified means for conveniently converting the blower unit between a low position discharge where an air blast is directed from the bottom of the blower housing generally parallel to the ground and a high position outlet where an air blast is discharged downwardly at an inclined angle relative to the ground. Thus the blower unit of the invention provides for quickly changing the directional angle at which the air blast is discharged according to the condition of the debris being removed and the condition of the surface from which the debris is removed. The blower unit further provides the operator of the unit with means for conveniently adjusting an air discharge deflector or baffle supported adjacent the blower outlet and while the blower unit is moving, regardless of whether the outlet is in a low position or a high position relative to the ground or other surface.

In accordance with the illustrated embodiment of the invention, a gasoline engine is mounted on a wheel supported frame, and a handle assembly projects rearwardly and upwardly from the frame. An annular support plate is mounted on the engine concentrically with the engine shaft and has an outer peripheral portion which is secured by a releasable band clamp to a mounting ring forming a part of a blower housing. An impeller is mounted on the engine shaft within the blower housing, and the housing has a tangential outlet portion which supports a movable air deflector or baffle assembly.

The band clamp is actuated by an over-center latch mechanism which provides for a quick release, and when the band clamp is released, the blower housing may be rotated approximately 230° for selectively positioning the blower outlet portion at either a low position extending tangentially from the bottom of the blower housing or a high position extending tangentially from the top of the blower housing. The air deflector unit for the blower outlet includes a set of opposing baffle members which are actuated by an elongated control member having a rearward actuating end portion adjacent the handle assembly. The control member is supported to permit rotation of the blower housing outlet between its high and low positions without requiring disconnection of the member.

Other features and advantages of the invention will be apparent from the following description, the accompanying drawing and the appended claims.

BRIEF DESCRIPTION OF THE DRAWING

FIG. 1 is a perspective view of the mobile blower unit constructed in accordance with the invention and illustrating the blower outlet in its high position.

FIG. 2 is another perspective view of the blower unit with the blower outlet shown in its low position;

FIG. 3 is a side elevational view of the blower unit shown in FIG. 2 and with a portion of the blower housing broken away;

FIG. 4 is an enlarged fragmentary section of a portion of the blower unit shown in FIG. 3 and illustrating the mounting and clamping of the blower housing to its support plate;

FIG. 5 is a slightly enlarged side elevational view of the adjustable air deflector or baffle assembly shown in FIGS. 1-3;

FIG. 6 is an end view of the air baffle assembly shown in FIG. 5; and

FIG. 7 is a fragmentary perspective view of the latch mechanism for the coupling band clamp shown in FIGS. 3 and 4.

DESCRIPTION OF THE PREFERRED EMBODIMENT

Referring to FIG. 1, an internal combustion gasoline engine 10 is mounted on a fabricated steel base frame 12 which is supported by a set of wheels 14 mounted on corresponding axles 16 projecting outwardly from the frame 12. The engine 10 has a drive shaft 18 which projects through a center hole within a concentric flat annular support member or plate 20 (FIGS. 3 and 4) having a beveled outer peripheral surface 21. This support member or plate 20 is rigidly secured to the engine 10 by a set of machine screws (not shown) which project through corresponding spacer blocks 23.

A handle assembly 25 projects upwardly and rearwardly from the base frame 12 and includes a set of tubular steel handle members 27 having corresponding upper end portions which turn downwardly to form handle grip portions 28. The lower end portions of the handle members 27 are connected to the base frame 12 by bolts 31, and the upper end portions of the handle members are rigidly connected by a cross bar or rod 32 (FIG. 2) secured to the members 27 by bolts 33. A set of tubular steel handle brace members 34 have corresponding upper end portions rigidly secured to the handle members 27 by the bolts 33 and lower end portions secured by bolts 36 to the engine support frame 12. The speed of the engine is controlled by a throttle 38 which is mounted on the cross bar 32 and is connected by a flexible Bowden cable 39 to the carburetor for the engine.

A centrifugal type blower housing 40 is preferably constructed of two mating front and rear sections which are molded of a rigid plastics material and cemented together, and the rear section has a flat inner or rear wall 41 having a center opening for receiving the engine shaft 14. A housing mounting ring 43 (FIG. 4) is rigidly secured to the rear wall 41 of the housing 40 by a series of peripherally spaced and axially extending screws 44 which extend through corresponding holes within the wall 41 and into threaded holes formed within a baffle ring 46 located within the housing 40. The mounting ring 43 includes an outwardly projecting flange portion 47 which has a beveled peripheral surface 48 corresponding to the beveled surface 21 of the radially disposed support plate 20.

A circumferentially extending band clamp 50 includes inwardly projecting and opposing tapered flange portions which engage the beveled surfaces 21 and 48 for coupling the mounting ring 43 to the support member or plate 20. As shown in FIG. 7, the opposing end portions of the band clamp 50 are releasably connected by an over-center latch mechanism 52. The latch mechanism 52 includes a formed sheet metal handle member 53 which is pivotally connected to one end portion of the band blamp 50.

A formed wire link member 56 has one end portion pivotally connected to the latch handle 53 and an opposite end portion pivotally connected to a formed sheet metal guide element 57 rigidly secured to the opposite end portion of the band clamp 50. When the latch mechanism 52 is in its released position (FIG. 7), blower housing 40, including the mounting ring 43, may be rotated relative to its support plate 20. When the latch handle 53 is pivoted to its over-center locked position, the band clamp 50 is firmly tightened so that the blower housing 40 and mounting ring 43 are rigidly and positively secured to the support plate 20.

As illustrated in FIG. 3, a centrifugal type impeller 60 includes a center hub portion 62 which is mounted on the forward end portion of the engine shaft 18 and projects forwardly from an integral radial wall portion 63. The baffle ring 46 closely surrounds the wall portion 63 to prevent debris from collecting between the wall portion 63 of the impeller 60 and the wall portion 41 of the housing 40. The impeller 60 also includes a plurality of peripherally spaced blades 64 which are molded or cast as an integral part of the hub 62 and the wall portion 63 of the impeller.

The blower housing 40 includes a front center inlet 66 (FIG. 3) which is preferably covered by a perforated circular screen member 68 secured to the front wall of the blower housing 40 by a set of peripherally spaced support legs 69 and connecting screws. The blower housing 40 also includes a tangentially projecting outlet portion 72 which defines a generally rectangular outlet 74. The blower housing is protected by a formed tubular steel leg member 76 which extends across the front of the screen 68 and has rearward end portions rigidly secured to the engine support frame 12 by a set of bolts 77. As apparent from FIG. 3, when the mobile blower unit is tilted forwardly, the support leg member 76 engages the ground or other supporting surface.

As illustrated in FIGS. 1 and 2, when the band clamp 50 is moved to its released position, the blower housing 40 may be easily rotated on the axis of the engine shaft 18 through an angle of approximately 230° so that the outlet portion 72 of the blower housing may be selectively located at either a high position (FIG. 1) or a low position (FIG. 2). After the operating position is selected, the latch mechanism 52 is moved to its locked position so that the blower housing 40 is positively clamped to the plate 20 and will not vibrate from its selected position.

An air blast deflecting assembly 80 (FIGS. 5 and 6) is mounted on the outlet portion 72 of the blower housing 40 and includes a pair of rectangular side plates 82 which are secured to the front and rear sidewalls of the blower outlet portion 72 by bolts 83. A pair of upper and lower baffle plates or members 84 each have a U-shaped configuration and are positioned in opposing relation between the side plates 82. Each of the baffle members 84 is pivotally supported by a corresponding crosspin or shaft 86. Each of the shafts 86 is rigidly secured or welded to its corresponding baffle member 84 and is rotatably supported by a corresponding set of aligned holes formed within the side plates 82. The outer projecting end portions of the baffle members 84 are connected by a formed wire link member 88 (FIG. 6) so that the baffle members 84 move or pivot in unison. As shown in FIGS. 5 and 6, the front side plate 82 of the deflector assembly 80 and the adjacent wall of the blower housing portion 72 also support a hand knob 90 which is gripped when it is desired to rotate the blower housing 40 on the axis of the engine shaft 18 to move the outlet portion 72 and the deflector assembly outlet portion 72 between its high and low positions.

Referring to FIGS. 3 and 6, a connector or coupling element 93 is mounted on the rearward end portion of the upper shaft 86 of the deflector assembly 80 and has a hole for receiving an eye bolt 94 which is rigidly secured to the forward end portion of an elongated control rod 95. The control rod 95 extends upwardly and rearwardly over the handle members 27. The rearward end portion of the control rod is rotatably supported within a circular hole formed within a bracket 97 rigidly secured to the cross rod 32 of the handle assembly 25. A hand actuating lever 98 is secured to the upper end portion of the control rod 95, and a compression coil spring 99 extends between the actuating lever 98 and the bracket 97 so that the control rod 95 exerts a continuous tension on the coupling element 93 and the connected shaft 86 of the deflector assembly 80.

From the drawing and the above description, it is apparent that a mobile blower unit constructed in accordance with the invention, provides desirable features and advantages. For example, by simply releasing the latch mechanism 52, the blower housing 40 may be easily rotated by use of the handle knob 90 to move the outlet portion 72 of the blower housing and the outlet 74 between its low position shown in FIG. 2 and its high position shown in FIG. 1. Thus the air blast discharged from the blower housing 40 may be quickly and precisely positioned according to the condition of the leaves or other debris which is being removed and according to the condition of the ground, pavement or other surface from which the leaves and debris are being removed.

Furthermore, the support of the blower housing 40 also permits the blower housing to be rotated until the outlet portion 72 is in an upwardly projecting position so that the blower unit can be moved through a narrow gate opening or another narrow clearance space. When the friction band clamp 50 is drawn tight by locking of the over-center latch mechanism 52, the blower housing 40 is positively clamped to the support member or plate 20 mounted on the engine 10, thereby assuring that the blower housing is rigidly coupled to the engine and does not rotate from its selected position due to vibration.

Another important feature of the blower unit is provided by the control system for precisely positioning the baffle members 84 to select the optimum angle at which the air blast is discharged from the blower housing 40. That is, the control rod 95 and its support by the bracket 97 and its connection to the coupling element 93 provide for a relative universal movement so that the outlet end portion 72 of the blower housing 40 may be rotated between its high and low positions without requiring disconnection of the control rod. Furthermore, the control rod 95 permits the operator to adjust the position of the baffle members 84 regardless of the position of the blower outlet, simply by rotating the actuating lever 98. Thus while the operator is moving across the ground with the blower unit, he may easily adjust the angle at which the air blast is discharged regardless of whether the blower outlet is in its low position or its high position.

While the form of blower unit herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. A mobile blower unit adapted for clearing leaves and other debris from a surface, comprising a frame, a set of wheels supporting said frame for ground traversing movement, an engine mounted on said frame and having a substantially horizontal engine shaft, a handle assembly extending rearwardly and upwardly from said frame for guiding said unit along a selected path, a blower impeller driven by said engine shaft, a blower housing surrounding said impeller and having an inlet and an outlet, means supporting said housing for rotation on generally the horizontal axis of said engine shaft and relative to said engine for selectively moving said outlet in a substantially vertical plane between a high position on one side of said unit and a low position on the opposite side of said unit relative to said frame and said wheels, means for positively securing said housing with said outlet in either said high position or said low position, an adjustable air deflector member positioned adjacent said outlet of said blower housing, means supporting said air deflector member for pivotal movement between a first position directing air downwardly from said outlet and a second position directing air upwardly from said outlet, an elongated control member extending from said handle assembly to said air deflector member, said control member being movable over the top of said engine when said housing is rotated on said horizontal axis to move said outlet in said vertical plane between said high and low positions, said handle assembly including means supporting said control member to provide for said movement over the top of said engine, and means connecting said control member to said deflector member and providing for remotely adjusting the position of said air deflector member between said first and second positions from said handle assembly when said outlet is located in said high and low positions on opposite sides of said engine.

2. A blower unit as defined in claim 1 wherein said control member comprises a rigid control rod, flexible coupling means connecting one end portion of said control rod to said air baffle member, and means mounted on said handle assembly for rotatably supporting the opposite end portion of said control rod.

3. A blower unit as defined in claim 1 including an actuating shaft supporting said deflector member and extending generally parallel to said engine shaft, said control member comprises a rigid rod having a first end portion adjacent said handle assembly and a second end portion adjacent said deflector member, flexible coupling means connecting said second portion to said actuating shaft, and means on said first end portion of said control rod for manually rotating said control rod to adjust the position of said deflector member relative to said outlet.

4. In a mobile blower unit adapted for clearing leaves and other debris from a surface, and including a frame, a set of wheels supporting said frame for ground traversing movement, an engine mounted on said frame and having a generally horizontal engine shaft, a handle assembly extending rearwardly and upwardly from said frame for guiding said unit along a selected path, a blower impeller driven by said engine shaft, a blower housing surrounding said impeller and having a center inlet and a generally tangential outlet, the improvement comprising an annular support member mounted on said engine and surrounding said engine shaft, a mounting ring secured to said blower housing and having an outer diameter substantially the same as the outer diameter of said support member, a band clamp surrounding said support member and said mounting ring and supporting said housing for rotation on generally the axis of said engine shaft and relative to said engine for selectively positioning said outlet between a high position on one side of said unit and a low position on the opposite side of said unit relative to said frame and said wheels, and releasable latch means for said band clamp for positively securing said housing with said outlet in either said high position or said low position.

5. A blower unit as defined in claim 4 and including a movable air deflector member supported by said blower housing adjacent said outlet, a manual control mechanism extending from said handle assembly to said air deflector member for remotely adjusting the position of said air deflector member, and said control mechanism is movable with said blower housing when said housing is rotated to move said outlet between said high and low positions.

6. In a mobile blower unit adapted for clearing leaves and other debris from a surface, and including a frame, a set of wheels supporting said frame for ground traversing movement, an engine mounted on said frame and having a generally horizontal engine shaft, a handle assembly extending rearwardly and upwardly from said frame for guiding said unit along a selected path, a blower impeller driven by said engine shaft, a blower housing surrounding said impeller and having a center inlet and a generally tangential outlet, the improvement comprising an annular support member mounted in fixed relation to said engine and surrounding said engine shaft, a mounting ring secured to said blower housing and having an outer diameter substantially the same as the outer diameter of said support member, a band clamp surrounding said support member and said mounting ring and supporting said housing for rotation on generally the axis of said engine shaft and relative to said engine for selectively positioning said outlet between a high position on one side of said unit and a low position on the opposite side of said unit relative to said frame and said wheels, and means for releasably locking said band clamp for positively securing said housing with said outlet in either said high position or said low position.

7. In a mobile blower unit adapted for clearing leaves and other debris from a surface, and including a frame, a set of wheels supporting said frame for ground traversing movement, an engine mounted on said frame and having a substantially horizontal engine shaft, a handle assembly extending rearwardly and upwardly from said frame for guiding said unit along a selected path, a blower impeller driven by said engine shaft, a blower housing surrounding said impeller and having an inlet and an outlet, means supporting said housing for rotation on generally the horizontal axis of said engine shaft and relative to said engine for selectively moving said outlet in a substantially vertical plane between a high position on one side of said unit and a low position on the opposite side of said unit relative to said frame and said wheels, and means for positively securing said housing with said outlet in either said high position or said low position, the improvement comprising an adjustable air deflector member pivotally supported by said blower housing and projecting outwardly from said outlet, an elongated control member extending from said handle assembly to said air deflector member and adapted to be manually actuated adjacent said handle assembly, said control member being movable over the top of said engine when said housing is rotated on said horizontal axis to move said outlet in said vertical plane between said high and low positions, means connecting said control member to said deflector member and providing for remotely adjusting the position of said air deflector member from said handle assembly when said outlet is located in either of said high or low positions on opposite sides of said engine, said means supporting said blower housing including an annular support member rigidly connected to said engine and having an outer circular portion, a mounting ring secured to said blower housing and disposed adjacent said circular portion, an annular band clamp surrounding said support member and said mounting ring, and means for actuating and moving said band clamp between a clamped position and a released position to provide for convenient rotation of said blower housing.

8. A blower unit as defined in claim 7 wherein said band clamp includes opposite end portions disposed in adjacent relation, and said means for moving said band clamp comprise a latch actuating handle pivotally connected to one end portion of said band clamp, a link member pivotally connecting said actuating handle to the opposite end portion of said band clamp, and said link member has an over-center toggle action in response to pivotal movement of said actuating handle.

* * * * *